US011164216B2

(12) United States Patent
Trivedi et al.

(10) Patent No.: US 11,164,216 B2
(45) Date of Patent: Nov. 2, 2021

(54) ELECTRONIC SYSTEM AND METHOD FOR ADVERTISEMENT PRICING

(71) Applicant: MASTERCARD INTERNATIONAL INCORPORATED, Purchase, NY (US)

(72) Inventors: Shashank Kumar Trivedi, New Delhi (IN); Vikas Bishnoi, Jodhpur (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 230 days.

(21) Appl. No.: 16/127,096

(22) Filed: Sep. 10, 2018

(65) Prior Publication Data

US 2019/0156371 A1 May 23, 2019

(30) Foreign Application Priority Data

Nov. 17, 2017 (SG) .......................... 10201709512U (51) Int. Cl.
*G06Q 30/02* (2012.01)
*G06F 16/29* (2019.01)
*G06F 16/909* (2019.01)

(52) U.S. Cl.
CPC ......... *G06Q 30/0273* (2013.01); *G06F 16/29* (2019.01); *G06F 16/909* (2019.01); *G06Q 30/0205* (2013.01); *G06Q 30/0246* (2013.01)

(58) Field of Classification Search
None
See application file for complete search history.

(56) References Cited

U.S. PATENT DOCUMENTS

| 2008/0215415 | A1* | 9/2008 | Willms | G06Q 30/0264 705/14.43 |
| 2009/0012868 | A1* | 1/2009 | DeAngelis | G06Q 30/0264 705/14.5 |
| 2009/0158342 | A1* | 6/2009 | Mercer | G06Q 30/02 725/46 |

(Continued)

OTHER PUBLICATIONS

Stiving, Mark "Why value-based pricing works best", Jan. 6, 2017, https://web.archive.org/web/20170106132701/https://www.marketingdonut.co.uk/marketing-strategy/pricing/why-value-based-pricing-works-best, pp. 1-14 (Year: 2017).*

*Primary Examiner* — John Van Bramer (57) ABSTRACT

The present disclosure generally relates to an electronic system, a computerized method, and a non-transitory computer-readable storage medium for advertisement pricing. The system comprises a host server configured for performing steps of the method comprising: generating an electronic map representation of a geographical area; demarcating the electronic map representation into a plurality of demarcated regions; retrieving, from a transaction database, transaction data associated with merchant transactions in the plurality of demarcated regions; receiving, from a telecommunications service provider, mobile traffic data for generating consumer traffic data indicative of consumer traffic activity in the plurality of demarcated regions; and performing an advertisement pricing process to determine advertisement prices for each demarcated region based on at least the transaction data and consumer traffic data.

20 Claims, 5 Drawing Sheets

(56) References Cited

U.S. PATENT DOCUMENTS

| | | | |
|---|---|---|---|
| 2014/0164511 A1* | 6/2014 | Williams | G06Q 30/0277 709/204 |
| 2015/0073954 A1* | 3/2015 | Braff | G06Q 40/00 705/30 |
| 2015/0332292 A1* | 11/2015 | Unser | G06Q 30/02 705/7.31 |
| 2016/0117688 A1* | 4/2016 | Ghosh | H04W 4/027 705/7.29 |

* cited by examiner

Table 1:

| Period | Transaction Parameter P1 | Traffic Parameter P2 | Predefined Advertisement Price Reference P3 | Advertisement Price (= P1 x P2 x P3) |
|---|---|---|---|---|
| 0000 to 0100 hours | 3.0 | 0.1 | $100 | $30 |
| 0100 to 0200 hours | | 0.2 | | $60 |
| 0200 to 0300 hours | | 0.4 | | $120 |
| 0800 to 0900 hours | | 0.8 | | $240 |
| 0900 to 1000 hours | | 1.2 | | $360 |
| 1900 to 2000 hours | | 1.6 | | $480 |
| 2000 to 2100 hours | | 1.8 | | $540 |

FIG. 4

Table 2:

| Period | Merchant Category | Transaction Parameter P1 | Traffic Parameter P2 | Predefined Advertisement Price Reference P3 | Advertisement Price (= P1 x P2 x P3) |
|---|---|---|---|---|---|
| 0000 to 0100 hours | 1 | 2.3 | 0.1 | $100 | $23 |
| | 2 | 0.6 | | | $9 |
| 0100 to 0200 hours | 1 | 2.3 | 0.2 | | $46 |
| | 2 | 0.6 | | | $12 |
| 0200 to 0300 hours | 1 | 2.3 | 0.4 | | $92 |
| | 2 | 0.6 | | | $24 |
| 0800 to 0900 hours | 1 | 2.3 | 0.8 | | $184 |
| | 2 | 0.6 | | | $48 |
| 0900 to 1000 hours | 1 | 2.3 | 1.2 | | $276 |
| | 2 | 0.6 | | | $72 |
| 1900 to 2000 hours | 1 | 2.3 | 1.6 | | $368 |
| | 2 | 0.6 | | | $96 |
| 2000 to 2100 hours | 1 | 2.3 | 1.8 | | $414 |
| | 2 | 0.6 | | | $108 |

ELECTRONIC SYSTEM AND METHOD FOR ADVERTISEMENT PRICING

CROSS REFERENCE TO RELATED APPLICATION

This application claims priority to Singapore Application No. 10201709512U, filed Nov. 17, 2017, entitled "ELECTRONIC SYSTEM AND METHOD FOR ADVERTISEMENT PRICING", the entirety of which is incorporated herein by reference.

TECHNICAL FIELD

The present disclosure generally relates to an electronic system and method for advertisement pricing. Particularly, the present disclosure describes various embodiments of an electronic system and method for determining advertisement prices based on at least transaction data and consumer traffic data.

BACKGROUND

Advertisements may be defined or used as a form of marketing communication for promoting or selling merchandise, such as goods, products, services, and other activities. Merchants and businesses often rely on various advertising channels to attract customers to purchase their merchandise. Some of these advertising channels include displaying visual advertisements at various locations in a geographical area, such as a city or town. These locations tend to include places of interests where consumer traffic activity is high, such as airports, hotels, restaurants, highways, and shopping streets. Some examples of these advertisements include visual advertisements on digital screens, banners, posters, hoardings, and billboards.

Conventionally, the different types of advertisements are charged to merchants based on a fixed price rate, such as $1,000 per day. In some cases, this fixed price rate is charged regardless of location. However, merchants may not know which locations have higher consumer traffic activity and may end up paying the same fixed price rate for locations where there is low consumer traffic activity. In some other cases, this fixed price rate may be dependent on the specific location of the advertisement. For example, the fixed price rate may be higher if the advertisement is positioned at a location, such as a business district, where there is potentially higher consumer traffic activity. However, business districts are likely to have relatively higher consumer traffic activity during weekday morning and evening peak hours, and relatively lower consumer traffic activity at other hours and weekends. Merchants have to pay the fixed price rate for the entire day but there is high consumer traffic activity only during limited hours of the day, which will result in the merchants finding that their money spent is not worthwhile.

Therefore, in order to address or alleviate at least one of the aforementioned problems and/or disadvantages, there is a need to provide an electronic system and method for advertisement pricing.

SUMMARY

According to an aspect of the present disclosure, there is an electronic system, a computerized method, and a non-transitory computer-readable storage medium for advertisement pricing. The system comprises a host server configured for performing steps of the method comprising: generating an electronic map representation of a geographical area; demarcating the electronic map representation into a plurality of demarcated regions; retrieving, from a transaction database, transaction data associated with merchant transactions in the plurality of demarcated regions; receiving, from a telecommunications service provider, mobile traffic data for generating consumer traffic data indicative of consumer traffic activity in the plurality of demarcated regions; and performing an advertisement pricing process to determine advertisement prices for each demarcated region based on at least the transaction data and consumer traffic data.

An electronic system and method for advertisement pricing according to the present disclosure is thus disclosed herein. Various features, aspects, and advantages of the present disclosure will become more apparent from the following detailed description of the embodiments of the present disclosure, by way of non-limiting examples only, along with the accompanying drawings.

DETAILED DESCRIPTION

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "/" in a figure or associated text is understood to mean "and/or" unless otherwise indicated. For purposes of brevity and clarity, descriptions of embodiments of the present disclosure are directed to an electronic system and method for advertisement pricing, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, known systems, methods, procedures, and components have not been described in detail so as to not unnecessarily obscure aspects of the embodiments of the present disclosure.

Overview

Figure 1:
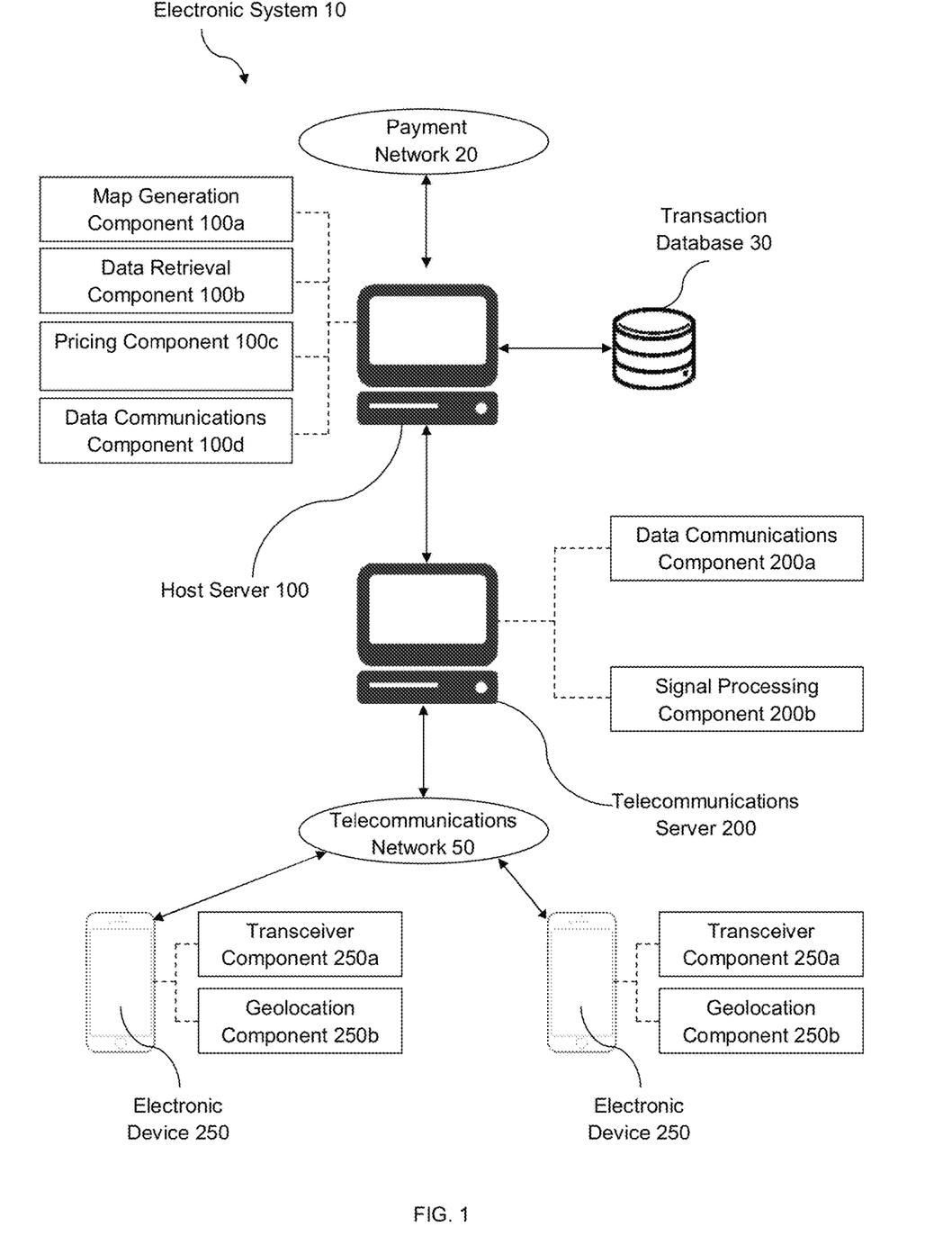
FIG. 1 is an illustration of an electronic system for advertisement pricing, in accordance with embodiments of the present disclosure.

In representative or exemplary embodiments of the present disclosure, there is provided an electronic system 10 for advertisement pricing as illustrated in a schematic diagram in FIG. 1. The system 10 includes a host server 100 operative by a financial entity, such as Mastercard® or Visa®, for performing various steps of a method for advertisement pricing. The system 10 further includes a payment network 20 for processing merchant transactions between merchants and consumers. The system 10 further includes a transaction database 30 for storing details of the merchant transactions.

Figure 2:
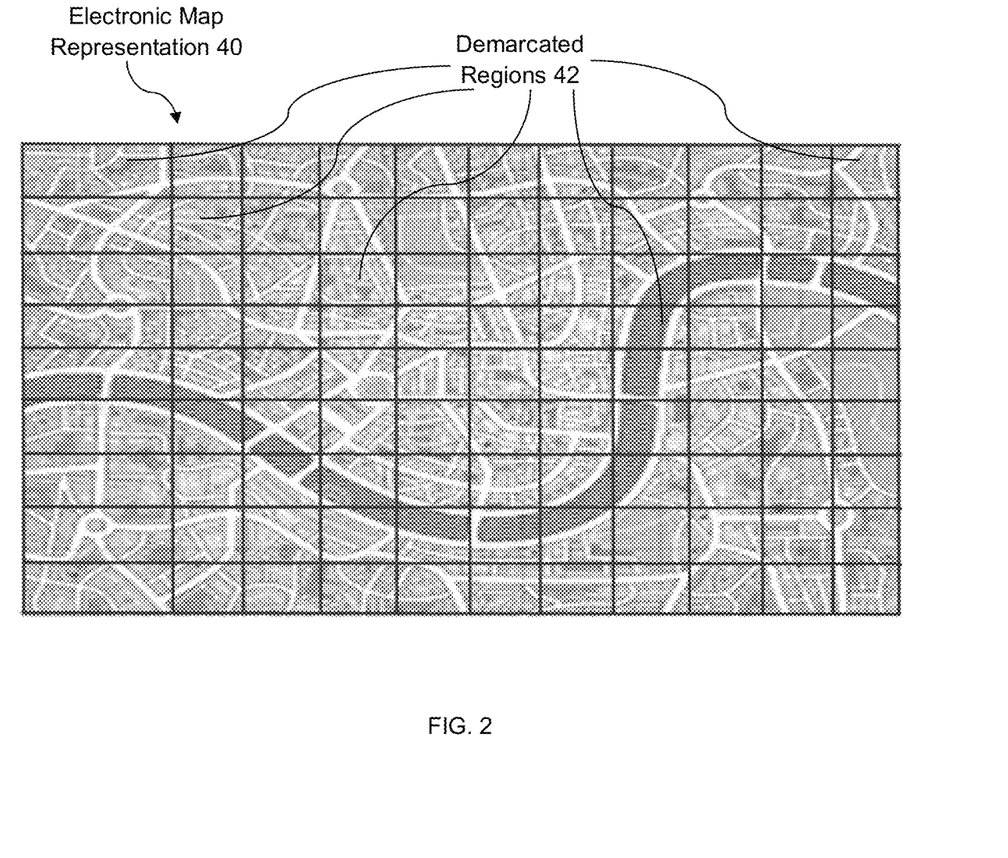
FIG. 2 is an illustration of an electronic map representation of a geographical area, in accordance with embodiments of the present disclosure.

The host server 100 generates an electronic map of a geographical area, such as a city, town, or country. Specifically, this electronic map serves as a representation of the geographical area. FIG. 2 illustrates an example of an electronic map representation 40 of a geographical area. The electronic map representation 40 is demarcated into a plurality of demarcated regions 42, such that data analysis of the electronic map representation 40 can be more efficiently performed by distributing the analysis process among the demarcated regions 42.

The host server 100 receives details of the merchant transactions from the transaction database 30. Specifically, the host server 100 receives transaction data associated with merchant transactions in the plurality of demarcated regions 42. Expenditure data within each demarcated region 42 is determinable from the transaction data.

The system 10 further includes a server 200 of a telecommunications provider, the telecommunications server 200 communicatively linked to the host server 100. The telecommunications server 200 is operated by a telecommunications entity, such as Verizon® or AT&T®. The telecommunications server 200 is communicatively linked to and operative with a telecommunications network 50 operated by the telecommunications service provider for providing telecommunication services, such as internet service and radiocommunication service for electronic devices 250 of consumers. The telecommunications server 200 generates mobile traffic data that is used to generate consumer traffic data indicative or representative of consumer traffic activity in the plurality of demarcated regions 42. The mobile traffic data is communicated from the telecommunications server 200 to the host server 100.

The host server 100 performs an advertisement pricing process to determine advertisement prices for each demarcated region 42 based on at least the transaction data and consumer traffic data. As the transaction data and consumer traffic data in one demarcated region 42 are usually different from another demarcated region 42, the advertisement prices will vary among the demarcated regions 42. For example, demarcated regions 42 with higher expenditure (determined from the transaction data) and with higher consumer traffic activity (determined from the consumer traffic data) will have higher advertisement prices as compared to other demarcated regions 42. Based on the varying advertisement prices and the parameters affecting the advertisement prices, merchants can assess which demarcated regions 42 are more suitable to place advertisements to advertise their merchandise.

Description of Embodiments

Figure 3:
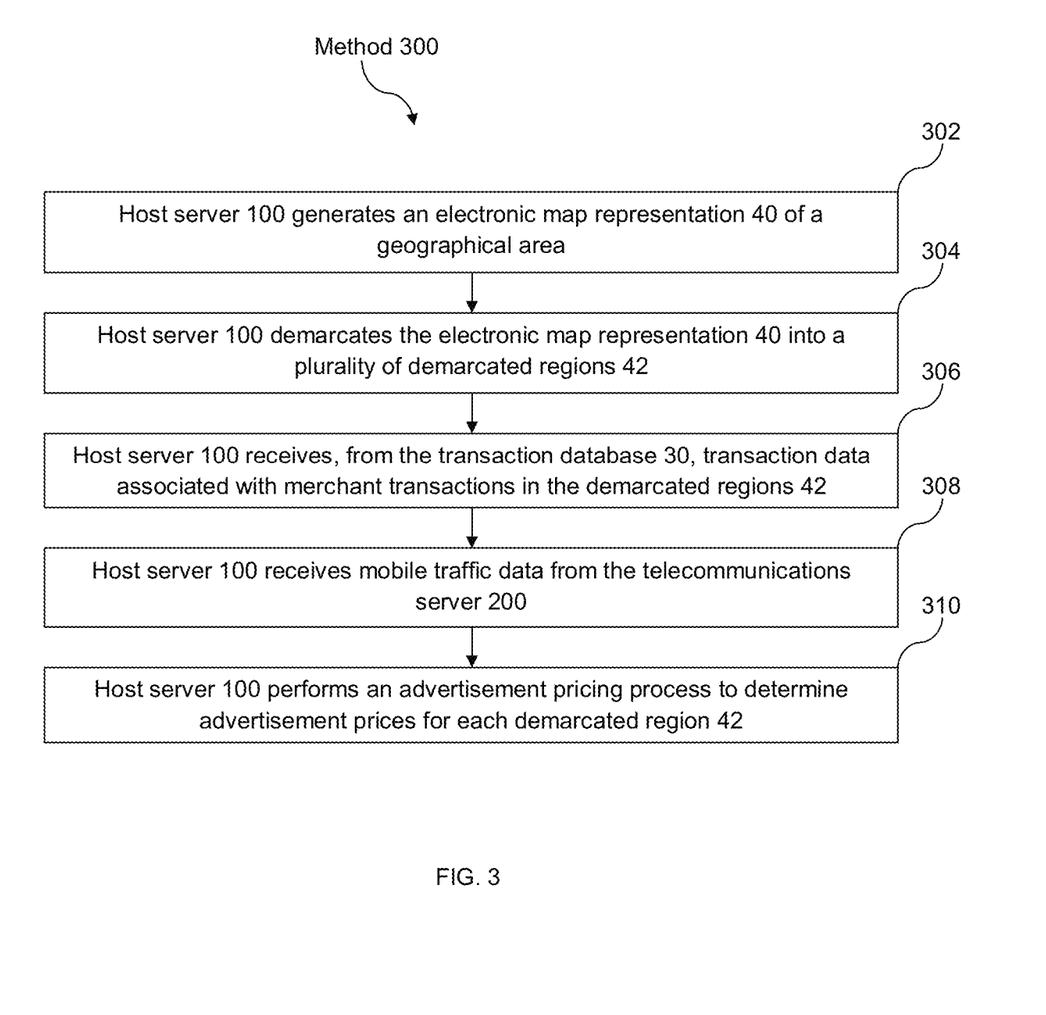
FIG. 3 is a flowchart illustration of a computerized method for advertisement pricing, in accordance with embodiments of the present disclosure.

In representative or exemplary embodiments of the present disclosure, the electronic system 10 for advertisement pricing as illustrated in FIG. 1 includes a host server 100 having a processor and a data storage device or memory configured to store computer-readable instructions for performing various steps of a method 300 for advertisement pricing. With further reference to FIG. 3, the method 300 is described as a computerized method 300 implemented on the system 10.

In a step 302 of the method 300, a map generation component/module 100a of the host server 100 generates an electronic map representation 40 of a geographical area, as shown in FIG. 2. The geographical area may span broadly across an entire country or focused on a specific vicinity, e.g. a city or town. The electronic map representation 40 may be generated from or provided by an electronic or digital map service provider, such as Google Maps or Apple Maps.

In a step 304, the map generation component 100a demarcates the electronic map representation 40 into a plurality of demarcated regions 42, as shown in FIG. 2. The demarcated regions 42 may be arranged in an array-like form wherein the demarcated regions 42 are identical in shape and size to one another. For example, each demarcated region 42 may be a square region with an area of 0.5 square miles. Alternatively, the electronic map representation 40 may be demarcated freely such that the demarcated regions 42 have varying shapes and sizes. Each demarcated region 42 represents a specific region or subset of the geographical area. Particularly, each demarcated region 42 has a number of merchants operating, such as in the form of retail stores, and a number of consumers present at any one time. The locations of the merchants/retail stores may be represented by their location addresses and/or latitude/longitude coordinates. Similarly, the boundaries of each demarcated region 42 may be defined by respective latitude/longitude line boundaries. The number of consumers in the demarcated region 42 is associated with the consumer traffic activity in the demarcated region 42.

In a step 306, the host server 100 receives, from the transaction database 30, transaction data associated with merchant transactions in the plurality of demarcated regions 42. Particularly, the host server 100 includes a data retrieval component/module 100b for retrieving the transaction data from the transaction database 30. The transaction data is generated from merchant transactions, i.e. transactions between merchants and consumers, in the demarcated regions 42. For example, in a transaction between a merchant and a consumer, the transaction data is communicated from a merchant point-of-sale (POS) terminal/billing machine to the payment network 20 for processing of the transaction. The transaction data includes, among other things, identification data of the merchant and expenditure data of the transaction (i.e. transaction cost or amount). The transaction data is communicated from the payment network 20 to the host server 100 for subsequent analysis.

Based on the merchant identification data in the transaction data, the location of the merchant can be determined as each merchant or retail store is uniquely identified by the merchant identification data. For example, the merchant identification data includes a location address of the merchant/retail store. This location address may be converted to latitude/longitude coordinates to determine which demarcated region 42 it resides in. A merchant/retail store is considered to reside within a demarcated region 42 if the latitude/longitude coordinates of the merchant/retail store is within the latitude/longitude coordinates line boundaries of the demarcated region 42. Additionally, the merchant identification data may include or be used to identify the merchant category or industry of the merchant. Some merchant categories or codes include GRO (groceries), EAP (eating places), and BWL (beer, wine & liquor). Some merchant industries include everyday spend industry, travel and entertainment industry, and consumer packaged goods industry. The merchants in each of the demarcated regions 42 can thus be identified, and the transaction data associated with merchant transactions in each demarcated region 42 can be determined. For example, in a demarcated region 42, there is a number of merchant transactions that has occurred over a predefined historical period, e.g. 6 months or 1 year. For each merchant transaction, there is transaction data associated therewith and the transaction data includes the expenditure data and optionally the merchant category.

In a step 308, the host server 100 communicatively linked to the telecommunications server 200 receives mobile traffic data from the telecommunications service provider. Particularly, the telecommunications server 200 includes a data communication module 200a for communicating the mobile traffic data to a corresponding data communication module 100d of the host server 100. The telecommunications server 200 further includes a signal processing component/mobile 200b for processing/analyzing radio signals emitted from the consumer electronic devices 250 that are communicatively linked to the telecommunications network 50. The telecommunications network 50 operated by the telecommunications service provider may be a cellular network via cell tower, broadband network such as Internet, or wireless network via access point.

At any one time, there is a number of consumers (zero or more) present in each demarcated region 42. For example, during peak hours such as in the evenings, some demarcated regions 42 may have more consumers roaming. Each consumer holds one or more electronic devices 250, such as mobile devices, mobile phones, smartphones, personal digital assistants (PDAs), tablets, laptops, and/or computers. The electronic devices 250 are normally active for data communication such that transceiver components/modules 250a of the electronic devices 250 emit radio signals that are received by various cell stations/towers of the telecommunications network 50. The radio signals from the electronic devices 250 allow the electronic devices 250 to be tracked by the signal processing component 200b of the telecommunications server 200. Tracking of the electronic devices 250 may be performed by localization, as will be readily understood by the skilled person. For example, localization may occur either via multilateration of radio signals between the electronic devices 250 and cell towers of the telecommunications network 50, or via global positioning system relying on geolocation components/modules 250b of the electronic devices 250.

By tracking the electronic devices 250, the locations of the electronic devices 250, and thus of the consumers holding the electronic devices 250, can be determined. This enables the telecommunications server 200 to generate the mobile traffic data in each demarcated region 42, wherein the mobile traffic data used by the host server 100 to generate consumer traffic data that is indicative of consumer traffic activity in the demarcated region 42. In one embodiment, the mobile traffic data for a demarcated region 42 is generated by tracking the positions of the electronic devices 250 by localization, as described above. Particularly, the positions are tracked using the cell towers servicing the demarcated region 42, so that the number of electronic devices 250 in the demarcated region 42 at any one time or period can be at least estimated. The consumer traffic data may thus be determined or generated based at least on the number of electronic devices 250 in the demarcated region 42.

In another embodiment, the mobile traffic data for a demarcated region 42 is generated by determining the aggregated cellular traffic in the demarcated region 42. Particularly, cellular traffic flow (i.e. data flow) via the cell towers servicing the demarcated region 42 can be determined, so that the aggregated cellular traffic in the demarcated region 42 at any one time or period can be at least estimated. The consumer traffic data may thus be determined or generated based at least on the aggregated cellular traffic in the demarcated region 42.

In yet another embodiment, the mobile traffic data is generated by determining the cellular traffic density in the demarcated region 42. The cellular traffic density is typically calculated in the form of gigabits per second per square kilometre per MHz of licensed spectrum. The consumer traffic data may thus be determined or generated based at least on the cellular traffic density in the demarcated region 42. It will be appreciated that the mobile traffic data may be generated by one or more of the aforementioned ways and using methods and algorithms readily known to the skilled person.

The presence of more active electronic devices 250, higher aggregated cellular traffic, and/or higher cellular traffic density are indicative of more consumers being present in the demarcated region 42, thereby indicating that the consumer traffic activity in the demarcated region 42 is higher. Notably, consumer traffic activity in the demarcated region 42 may be different at different periods. For example, in the period from 0200 to 0300 hours, the consumer traffic activity is likely to be significantly lower than the period from 2000 to 2100 hours.

In some embodiments, the method 300 further comprises receiving, by the host server 100, service traffic data from one or more other service providers. Specifically, the host server 100 is communicable with one or more servers of the other service providers to obtain the service traffic data. The host server 100 analyzes the service traffic data to generate the consumer traffic data. Particularly, the service traffic data is collated/aggregated with the mobile traffic data to generate a more accurate estimation of the consumer traffic data in the demarcated regions 42. The other service providers include, but are not limited to, one or more map service providers, such as Google Maps and Apple Maps, and one or more transportation service providers, such as Uber, Grab, and Lyft. It will be appreciated that there may be other types of service providers for consumers that would be able to generate useful service traffic data.

In a step 310, a pricing component/module 100c of the host server 100 performs an advertisement pricing process to determine advertisement prices for each demarcated region 42. Particularly, the advertisement pricing process includes determining various parameters to derive the advertisement prices, wherein these parameters are determined based on at least the transaction data and consumer traffic data of each demarcated region 42.

The advertisement pricing process includes determining a transaction parameter for the advertisement prices based on at least expenditure data determined from the transaction data of merchant transactions in each demarcated region 42. In one embodiment, the transaction parameter is determined based on the expenditure data, i.e. spending amounts, of all the merchant transactions in each demarcated region 42.

Specifically, the spending amounts are aggregated to derive the overall spending amount of each demarcated region 42. In another embodiment, the transaction parameter is determined based additionally on the merchant categories determined from the transaction data. Specifically, the spending amounts are aggregated according to the merchant categories of the merchant transactions, thereby obtaining the overall spending amount of each merchant category for each demarcated region 42. Various algorithms may be applied to the expenditure data/spending amounts to determine the transaction parameter, such as by normalizing or weighting, as will be readily understood by the skilled person. The algorithms may also be trained and refined with continued collection and analysis of more transaction data, thereby improving the reliability of the advertisement pricing process.

The advertisement pricing process further includes determining a traffic parameter for the advertisement prices based on periods of consumer traffic activity determined from the consumer traffic data of each demarcated region 42. In different periods, such as in one-hour periods within the day, the consumer traffic activity varies and this is indicated by the consumer traffic data. Various algorithms may be applied to the consumer traffic data, such as by normalizing or weighting, to determine the traffic parameter for the various periods, as will be readily understood by the skilled person. The algorithms may also be trained and refined with continued collection and analysis of more consumer traffic data, thereby improving the reliability of the advertisement pricing process.

In some embodiments, some of the electronic devices 250 may have been used to perform transactions with merchants in a demarcated region 42. The transaction data may enable the host server 100 to determine consumer preferences and a consumer parameter may be derived therefrom. This consumer parameter may provide an indication to the merchant as to whether a demarcated region 42 has consumer traffic activity from consumers whose interests are aligned with the merchant's business. Thus, the merchant is more likely to advertise in the demarcated region 42 if there is high consumer traffic activity from such consumers.

The advertisement pricing process further includes determining the advertisement prices for each demarcated region 42 based on at least the transaction parameter, traffic parameter, and a predefined advertisement price reference. The predefined advertisement price reference serves as an initial benchmark for determining the advertisement prices. For example, the predefined advertisement price reference may be an existing advertisement price (fixed price rate) for a demarcated region 42, such as an average price rate for displaying an advertisement banner. For purposes of brevity and clarity, it is assumed that the predefined advertisement price reference is constant for all the demarcated regions 42.

In one embodiment and for an exemplary demarcated region 42, the advertisement pricing process determines the transaction parameter P1 based on aggregated spending amounts of all merchant transactions in the demarcated region 42. The advertisement pricing process also determines the traffic parameter P2 based on one-hour periods of consumer traffic activity, as well as the predefined advertisement price reference P3. Some of the parameters for the demarcated region 42 are shown in Table 1 in FIG. 4.

In another embodiment, the transaction parameter P1 is based on spending amounts are aggregated according to the merchant categories of the merchant transactions. Some of the parameters for the demarcated region 42 are shown in Table 2 in FIG. 5.

Figure 4:
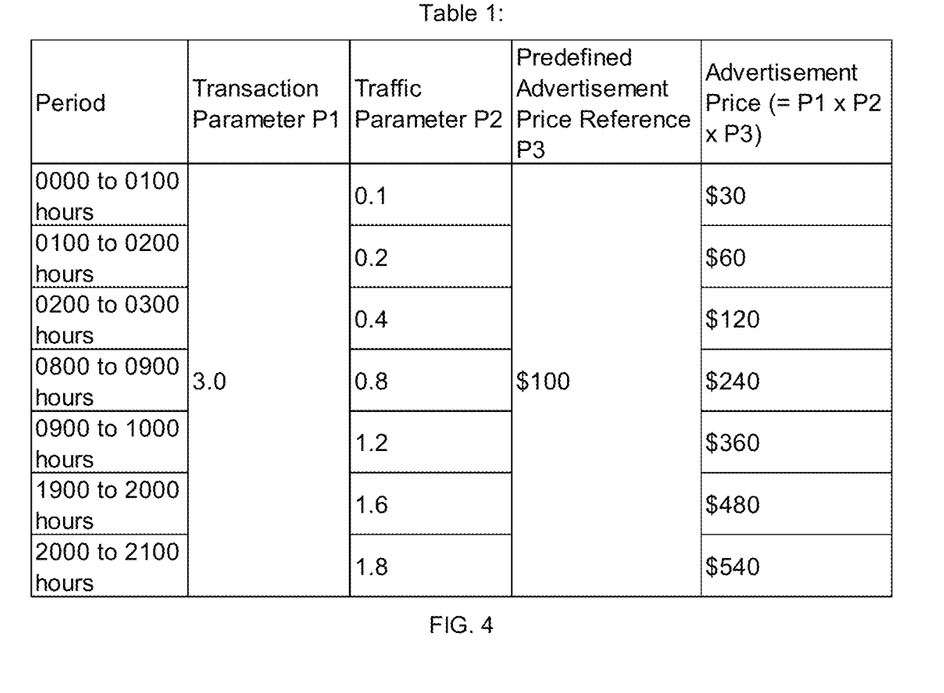
FIG. 4 is an illustration of a table of parameters for the advertisement prices, in accordance with an embodiment of the present disclosure.
Figure 5:
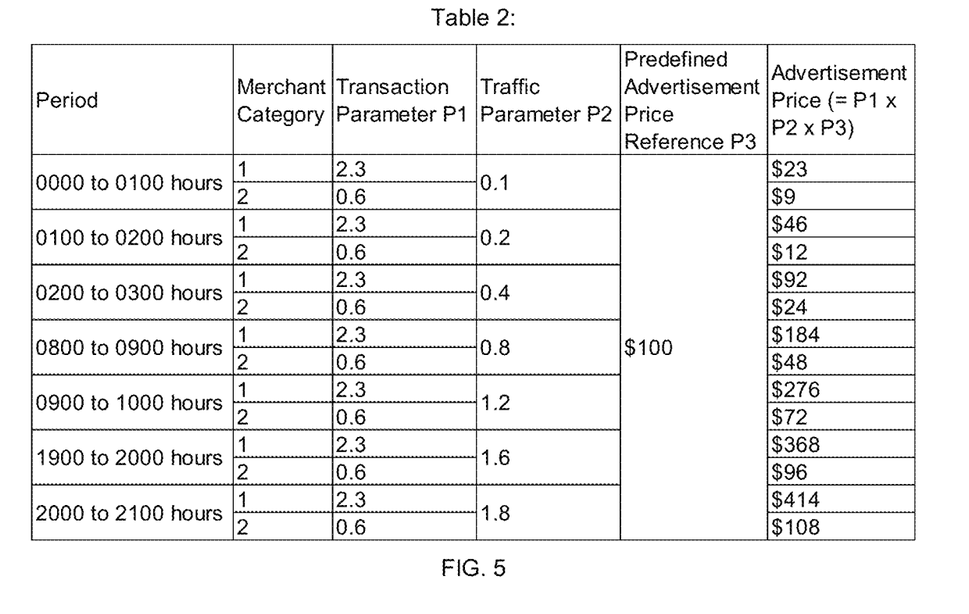
FIG. 5 is an illustration of another table of parameters for the advertisement prices, in accordance with another embodiment of the present disclosure.

From the tables in FIG. 4 and FIG. 5, it can be seen that the advertisement prices for each demarcated region 42 are separated/distinct by the merchant categories and/or the periods. Thus, for a demarcated region 42 where advertisements are intended to be displayed, the advertisement prices vary according to the different periods. This allows advertisement agencies to charge merchants of the advertisements according to the periods when their advertisements are displayed. Moreover, advertisement agencies may avail the periods for different merchants to select the appropriate periods to display their advertisements. For example, on a digital screen, a first advertisement from a first merchant may be displayed during a first period, and a second advertisement from a second merchant may be displayed during a second period. Merchants may select the periods based on the respective advertisement prices as well as the consumer traffic activity which relates to viewership of their advertisements.

Furthermore, the advertisement prices may be segmented according to the merchant category or industry. In this manner, merchants from different industries do not have to pay the same advertisement prices for displaying advertisements at the same demarcated region 42. For example, a merchant industry such as groceries/sundries pay lower advertisement prices than another merchant industry such as jewellery and branded goods, due to differences in the overall spending amounts of the merchant industries.

The advertisement prices also vary among the different demarcated regions 42. For example, demarcated regions 42 with higher expenditure and higher consumer traffic activity will have higher advertisement prices. Based on the varying advertisement prices and the parameters affecting the advertisement prices, merchants can assess which demarcated regions 42 are more suitable to place advertisements to advertise their merchandise.

In some embodiments, the advertisement pricing process further includes determining an amenity parameter for the advertisement prices based on local amenities of the demarcated regions 42. The advertisement prices for each demarcated region 42 are determined based additionally on the amenity parameter. These local amenities may include, but are not limited to, presence of major highways, intersections, total road length, service facilities, etc., within a demarcated region 42 and/or surrounding the demarcated region 42. The local amenities may further include natural resources/landscapes such as rivers and lakes. As these local amenities tend to attract more consumers into the demarcated region 42 and increase consumer traffic activity, the amenity parameter increases the advertisement prices for the demarcated region 42. Various algorithms may be applied to determine the amenity parameter as will be readily understood by the skilled person. The algorithms may also be trained and refined with addition/removal of amenities within/surrounding a demarcated region 42, thereby improving the reliability of the advertisement pricing process.

In some embodiments, the advertisement pricing process is iteratively performed at predefined intervals, enabling the advertisement pricing process to generate updated advertisement prices. Advertisement agencies can thus update their advertisement prices and charge merchants accordingly. In one embodiment, the predefined intervals are further apart, such as monthly, quarterly, or annually. This allows for accumulation of more transaction data and consumer traffic data to improve and refine the advertisement pricing process. In another embodiment, the iterations are performed more frequently, such as hourly or daily, enabling the advertisement pricing process to generate almost realtime advertisement prices so that merchants can be more accurately charged for displaying their advertisements.

Technical Architecture

Figure 6:
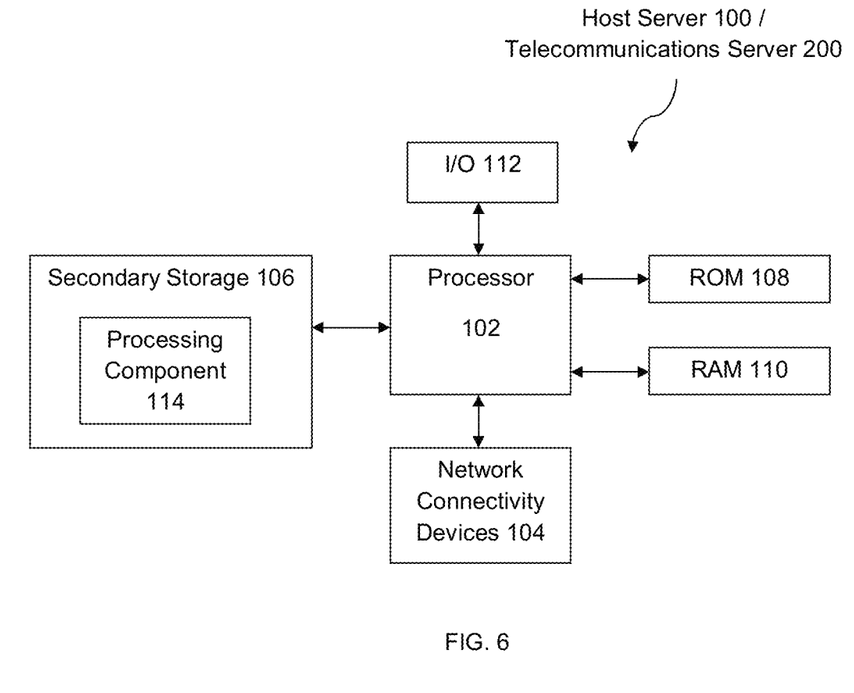
FIG. 6 is a block diagram illustration of the technical architecture of a host server of the electronic system of FIG. 1, in accordance with embodiments of the present disclosure.

The following is a description of the technical architecture of a server, such as the host server 100, with reference to FIG. 6. It will be appreciated that the telecommunications server 200 may have similar technical architecture as well.

The technical architecture of the host server 100 includes a processor 102 (also referred to as a central processor unit or CPU) that is in communication with memory devices including secondary storage 104 (such as disk drives or memory cards), read only memory (ROM) 106, and random access memory (RAM) 108. The processor 102 may be implemented as one or more CPU chips. Various modules or components for performing various operations or steps of the method 300 are configured as part of the processor 102 and such operations or steps are performed in response to non-transitory instructions operative or executed by the processor 102.

The technical architecture further includes input/output (I/O) devices 110, and network connectivity devices 112. The secondary storage 104 typically includes a memory card or other storage device and is used for non-volatile storage of data and as an over-flow data storage device if RAM 108 is not large enough to hold all working data. Secondary storage 104 may be used to store programs which are loaded into RAM 108 when such programs are selected for execution.

The secondary storage 104 has a processing component 114, including non-transitory instructions operative by the processor 102 to perform various operations or steps of the method 300 according to various embodiments of the present disclosure. The ROM 106 is used to store instructions and perhaps data which are read during program execution. The secondary storage 104, the ROM 106, and/or the RAM 108 may be referred to in some contexts as computer-readable storage media and/or non-transitory computer-readable media. Non-transitory computer-readable media include all computer-readable media, with the sole exception being a transitory propagating signal per se.

The I/O devices 110 may include printers, video monitors, liquid crystal displays (LCDs), plasma displays, touch screen displays, keyboards, keypads, switches, dials, mice, track balls, voice recognizers, card readers, paper tape readers, and/or other known input devices.

The network connectivity devices 112 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communication (NFC), radio frequency identity (RFID), and/or other air interface protocol radio transceiver cards, and other known network devices. These network connectivity devices 112 may enable the processor 102 to communicate with the Internet or one or more intranets. With such a network connection, it is contemplated that the processor 102 might receive information from the network, or might output information to the network in the course of performing the operations or steps of the method 300. Such information, which is often represented as a sequence of instructions to be executed using processor 102, may be received from and outputted to the network, for example, in the form of a computer data signal embodied in a carrier wave.

The processor 102 executes instructions, codes, computer programs, scripts which it accesses from hard disk, floppy disk, optical disk (these various disk based systems may all be considered secondary storage 104), flash drive, ROM 106, RAM 108, or the network connectivity devices 112. While only one processor 102 is shown, multiple processors may be present. Thus, while instructions may be discussed as executed by a processor, the instructions may be executed simultaneously, serially, or otherwise executed by one or multiple processors.

It will be appreciated that the technical architecture of the host server 100 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the technical architecture of the host server 100, at least one of the CPU 102, the ROM 106, and the RAM 108 are changed, transforming the technical architecture in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by known design rules.

In the foregoing detailed description, embodiments of the present disclosure in relation to an electronic system and method for advertisement pricing are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A system for advertisement pricing, the system comprising a host server configured for performing steps comprising:
   generating an electronic map representation of a geographical area;
   demarcating the electronic map representation into a plurality of demarcated regions;
   retrieving, from a transaction database, transaction data associated with merchant transactions in the plurality of demarcated regions;
   receiving, from a telecommunications service provider, mobile traffic data for generating consumer traffic data indicative of consumer traffic activity in the plurality of demarcated regions;
   determining presence of one or more highways or road intersections in at least one of the plurality of demarcated regions;
   performing an advertisement pricing process to determine advertisement prices for each demarcated region based on the transaction data and the consumer traffic data in one demarcated region relative to different demarcated regions; and
   incrementing an advertisement price for the at least one of the plurality of demarcated regions based on the determined presence of the one or more highways or road intersections.

2. The system of claim 1, the advertisement pricing process further comprising determining a transaction parameter for the advertisement prices based on at least one transaction amount determined from the transaction data.

3. The system of claim 2, the advertisement pricing process further comprising determining a traffic parameter for the advertisement prices based on periods of consumer traffic activity determined from the consumer traffic data.

4. The system of claim 3, the advertisement pricing process comprising determining the advertisement prices for each demarcated region based on at least one of the transaction parameter, traffic parameter, or a predefined advertisement price reference.

5. The system of claim 4, the advertisement pricing process further comprising determining an amenity parameter for the advertisement prices based on local amenities of the demarcated regions.

6. The system of claim 1, further comprising determining a total road length of a road in the at least one of the plurality of demarcated regions.

7. The system of claim 6, further wherein said incrementing the advertisement price for the at least one of the plurality of demarcated regions is based, in part, on the determined total road length of the road.

8. The system of claim 1, further comprising receiving, from one or more other service providers, service traffic data for aggregating with the mobile traffic data to generate the consumer traffic data.

9. The system of claim 1, wherein the advertisement pricing process determines the advertisement prices through, at least in part, applying an algorithm that normalizes or weights the transaction data of the at least one of the plurality of demarcated regions relative to a different demarcated region.

10. A computerized method for advertisement pricing performed by a host server, the method comprising:
    generating an electronic map representation of a geographical area;
    demarcating the electronic map representation into a plurality of demarcated regions;
    retrieving, from a transaction database, transaction data associated with merchant transactions in the plurality of demarcated regions;
    receiving, from a telecommunications service provider, mobile traffic data for generating consumer traffic data indicative of consumer traffic activity in the plurality of demarcated regions;
    determining presence of one or more highways in at least one of the plurality of demarcated regions;
    performing an advertisement pricing process to determine advertisement prices for each demarcated region based on the transaction data and the consumer traffic data in one demarcated region relative to different demarcated regions; and
    incrementing an advertisement price for the at least one of the plurality of demarcated regions based on the determined presence of the one or more highways.

11. The computerized method of claim 10, the advertisement pricing process comprising determining a transaction parameter for the advertisement prices based on at least one transaction amount determined from the transaction data.

12. The computerized method of claim 11, the advertisement pricing process further comprising determining a traffic parameter for the advertisement prices based on periods of consumer traffic activity determined from the consumer traffic data.

13. The computerized method of claim 12, the advertisement pricing process comprising determining the advertisement prices for each demarcated region based on at least one of the transaction parameter, the traffic parameter, or a predefined advertisement price reference.

14. The computerized method of claim 10, wherein the advertisement prices for each demarcated region are distinct for different merchant categories.

15. The computerized method of claim 13, wherein the advertisement prices for each demarcated region are distinct by the periods.

16. The computerized method of claim 10, further comprising receiving, from one or more other service providers, service traffic data for aggregating with the mobile traffic data to generate the consumer traffic data.

17. The computerized method of claim 16, wherein the other service providers comprise one or more map service providers and/or one or more transportation service providers.

18. The computerized method of claim 10, wherein the advertisement pricing process determines the advertisement prices through, at least in part, applying an algorithm that normalizes or weights the transaction data of the at least one of the plurality of demarcated regions relative to said different demarcated regions.

19. The computerized of claim 10, further comprising:
    determining a total road length of a road in the at least one of the plurality of demarcated regions; and
    incrementing the advertisement price for the at least one of the plurality of demarcated regions based, in part, on the determined total road length of the road.

20. One or more non-transitory computer-readable storage media storing computer-readable instructions for advertisement pricing by a host server that, when executed by a processor, cause the processor to at least:
    generate an electronic map representation of a geographical area;
    demarcate the electronic map representation into a plurality of demarcated regions;

retrieve, from a transaction database, transaction data associated with merchant transactions in the plurality of demarcated regions;

receive, from a telecommunications service provider, mobile traffic data for generating consumer traffic data indicative of consumer traffic activity in the plurality of demarcated regions;

determine presence of one or more highways or road intersections in at least one of the plurality of demarcated regions;

perform an advertisement pricing process to determine advertisement prices for each demarcated region based on the transaction data and the consumer traffic data in one demarcated region relative to different demarcated regions; and increment an advertisement price for the at least one of the plurality of demarcated regions based on the determined presence of the one or more highways or road intersections.

\* \* \* \* \*